Patented Nov. 15, 1938

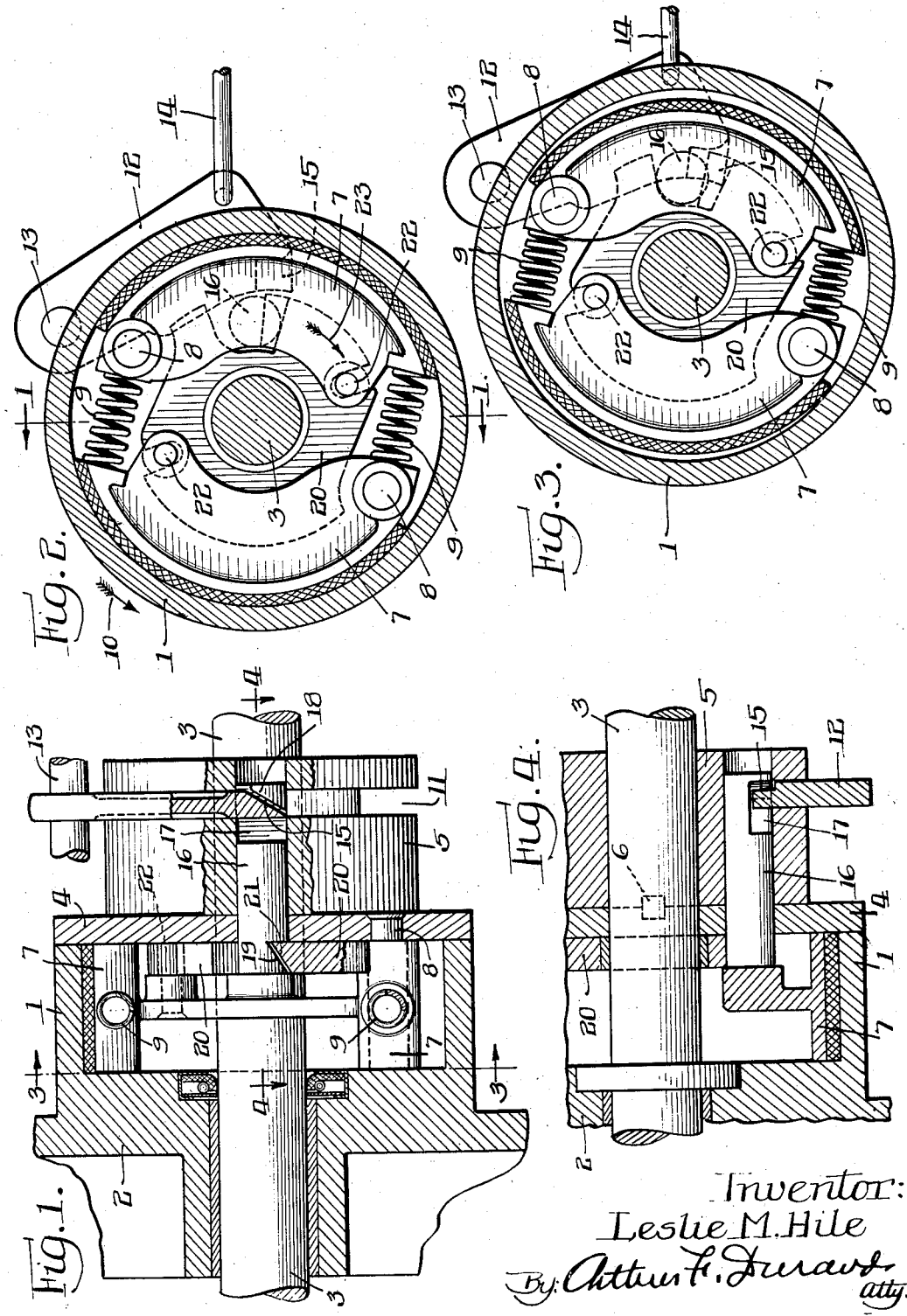

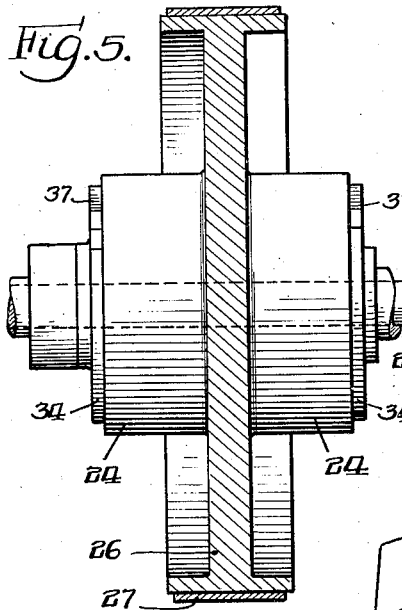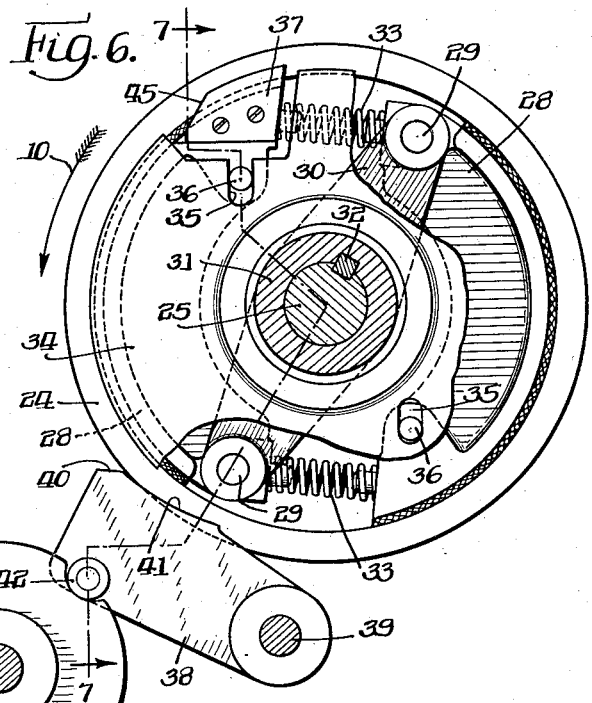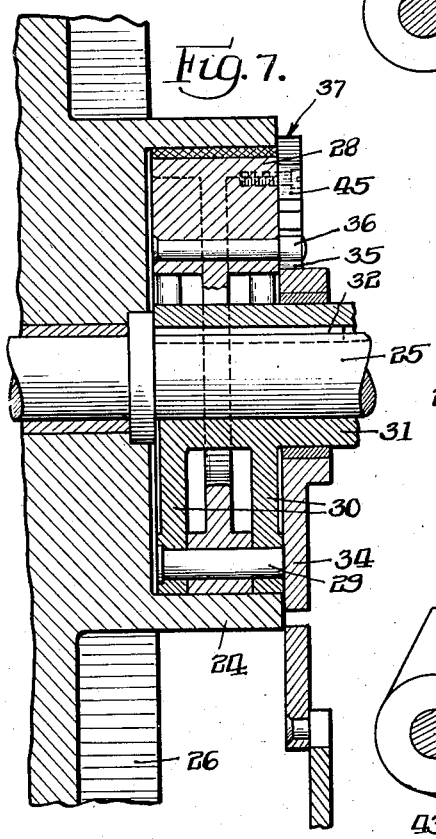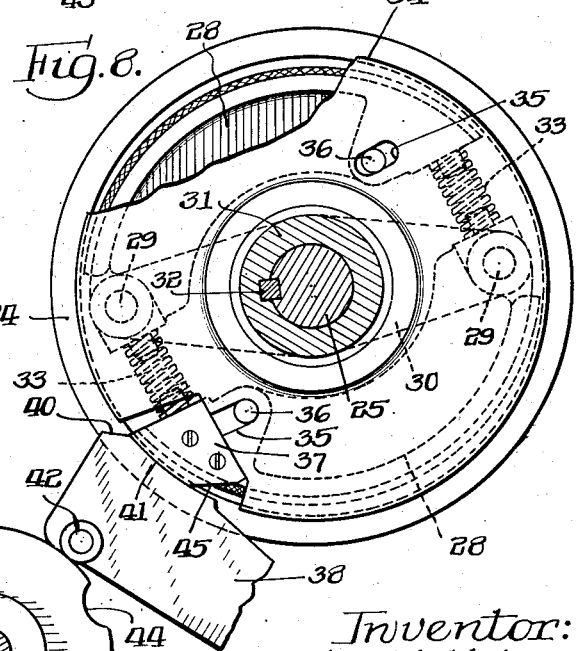

2,136,381

UNITED STATES PATENT OFFICE 2,136,381

FRICTION CLUTCH

Leslie M. Hile, Benton Harbor, Mich.

Application April 26, 1935, Serial No. 18,282

26 Claims. (Cl. 192—26)

This invention relates to friction clutches, and more particularly to those involving a drum with friction shoes therein, together with means for moving the shoes into and out of engagement with the frictional interior surface of the drum.

Generally stated, the object of the invention is to provide a novel and improved construction and arrangement whereby a clutch of this character may be opened and closed, or loaded and unloaded, as it is sometimes called, for one or more revolutions thereof, and which can be governed by an operator, as by manually operating a treadle or lever, or by other mechanical means, or even by electrical or hydraulic timing means, whereby the clutch will afford accurate and satisfactory control over any machine to which driving power is communicated through the clutch.

It is also an object to provide a novel and improved construction whereby a clutch of this character will tend to stand up longer, under practically constant use, and will not break or wear out as easily or as soon as other clutches heretofore employed for transmitting power, particularly at relatively high speed, to various kinds of machinery.

It is also an object to provide certain details and features of construction and combinations tending to increase the general efficiency and the desirability of a clutch of this particular character.

To the foregoing and other useful ends, the invention consists in matters hereinafter set forth and claimed and shown in the accompanying drawings, in which—

Fig. 1 is a vertical section on line 1—1 in Fig. 2 of the drawings, showing certain portions at the right in side elevation, with other portions shown broken away and in section, for convenience of illustration.

Fig. 2 is a transverse section on line 3—3 in Fig. 1 of the drawings.

Fig. 3 is also a section on said line 3—3, but showing the parts in a different position.

Fig. 4 is a horizontal section on line 4—4 in Fig. 1 of the drawings.

Fig. 5 is a side elevation of the pulley or wheel in the hub or hubs of which the clutch mechanism is enclosed, with certain portions thereof shown in section.

Fig. 6 is a view similar to Fig. 2, showing a different form of the invention.

Fig. 7 is a section on line 7—7 in Fig. 6 of the drawings, looking in the direction indicated by the arrows.

Fig. 8 is a view similar to Fig. 3, showing the form of the invention shown in Fig. 6 of the drawings.

As thus illustrated, referring to Figs. 1 to 4 inclusive, the invention comprises a rotary drum 1, which may be the hub portion of a wheel 2, to which latter power is communicated in any suitable or desired manner. The drum 1 is mounted to rotate freely on the shaft 3, in any suitable or desired manner. The purpose of the structure is to intermittently communicate the rotation of the drum 1 to the shaft 3, in a controlled manner, as follows: The disk plate 4 and the hub or barrel 5 may be separate, or they may be integral, as they are both keyed to the shaft by a key 6 of any suitable or desired character. Shoes 7 are pivoted on the plate 4 by pivots 8 fixed in the plate 4, as shown in the drawings. Coil springs 9, two in number, are each interposed between the free or distal end of one shoe, and the proximal or pivot end of the other shoe, and these springs are tensioned and of proper strength to press the friction faces of the shoes 7 effectively against the interior frictional surface of the drum 1, in order to cause the latter to rotate in the direction of the arrow 10 in Fig. 2 of the drawings.

The mechanism for releasing the friction shoes 7, of the clutch, is as follows: The hub or barrel 5 has a circumferential groove or channel 11 therein, shown more clearly in Fig. 1 of the drawings, and a clutch latch 12 is pivoted at 13, on any stationary object, and is provided with a controlling rod 14 for the operation thereof. This clutch latch has a bevel 15 at its distal end, and an endwise movable pin 16 is arranged parallel with the shaft 3, in the plane thereof, as shown more clearly in Fig. 4 of the drawings. This pin has a recess 17 in the outer side thereof, and one end of said recess has a bevel 18, corresponding to the bevel 15 on the latch, as shown in Figs. 1 and 2 of the drawings. The under side of the lefthand end of the pin 16 has a bevel 19, and the cam plate 20 is mounted to rotate, or oscillate slightly, on the shaft 3, and for this purpose is provided with a bevel 21 corresponding to the bevel 19 on the pin. The cam plate 20 has loose pivotal connections 22 and 22 with the distal ends of the shoes 7, as shown more clearly in Figs. 2 and 3 of the drawings, whereby slight oscillation of the cam plate 20 in the direction of the arrow 23 in Fig. 2 of the drawings will move the shoes 7 slightly out of engagement with the interior of the rotary drum 1, thereby interrupting the communication of power through the clutch to the shaft 3, and permitting the stopping of the rotation of the latter.

Therefore, when the latch 12 is moved into the position shown in Fig. 3 of the drawings, causing its bevel 15 to engage the bevel 18, with a wedging action, the pin 16, shown in Fig. 1, will be moved slightly to the right, causing its bevel 19 to engage the bevel 21, with the result that the cam plate 20 is rotated slightly in the direction indicated by the arrow 23 in Fig. 2 of the drawings. This, as is obvious, will tilt the friction shoes 7 about their pivots 8, away from the inner periphery of the drum 1, and the rotation of the shaft 3 will stop. Thereafter, when the latch 12 is returned to the position which it occupies in Fig. 2 of the drawings, the cam plate 20 will be free to oscillate back to the position shown in Fig. 2 of the drawings, with the result that the springs 9 will then be effective to press the shoes 7 against the inner periphery of the drum 1, and again the latter and the shaft 3 will rotate in unison, as the result of transmission of power through the clutch to the shaft.

Thus, the clutch construction shown and described provides a clutch that is accurate and fast, so to speak, one that is so quick and certain in its operation that the shaft can be intermittently rotated in the desired manner, for the desired intermittent control of any machine in connection with which the clutch is used, and the construction is such that a relatively long life is assured for the clutch, as it is found that it will stand hard and long use without danger of breaking or prematurely wearing out.

Referring to Figs. 5 to 8, inclusive, the construction comprises the outer drum or clutch housing 24, which is loose on the shaft 25 and, as shown in Fig. 5, there may be two of these drums, one at each side and rigid with the pulley 26, to which power is communicated by means of the belt 27, in a manner that will be readily understood.

As shown in Fig. 6, the shoes 28 are pivoted at one end by pins 29 on the arms 30, which latter are rigid with the sleeve 31, the latter being keyed by the spline 32 to the shaft 25 previously mentioned. Coil springs 33, like those previously described, are each interposed between the distal end of one shoe 28 and the proximal end of the other shoe, whereby the shoes are normally in frictional contact with the inner periphery of the drum, whereby the rotation of the pulley 26 will cause rotation of the shaft 25 in the desired manner.

To release the shoes from the drum, when it is desired to open or unload the clutch, mechanism is provided comprising the cam plate 34 which is oscillatory upon the shaft 25, and which is provided with slots 35 for engagement with the pins 36 that are rigidly inserted in the shoes, near the distal ends of the latter. Also, adjacent one of these pins 36, on the end of one shoe, there is a cam block 37 securely attached to the shoe. With this construction, the entire clutch mechanism has mass rotation, so to speak, when the shoes are in frictional engagement with the drum. However, for the purpose of disengaging the shoes from the drum, the cam arm 38 is pivoted on a shaft or suitable support 39, and is formed with a bevel 40 and a curved face 41, in the manner shown in Figs. 6 and 8 of the drawings. The arm 38 has a roller or projection 42, and an oscillatory cam 43 is provided with a notch 44 for engaging said roller or projection, normally, as shown in Fig. 6 of the drawings, whereby the clutch mechanism is in condition to transmit power from the pulley 26 to the shaft 25, in the desired manner.

However, when the oscillatory cam 43 is moved into the position shown in Fig. 8 of the drawings, the roller projection 42 is thereby disengaged from the notch 44, with the result that the arm 38 is pushed upwardly, whereby the bevel 45 on the block 37, previously mentioned, will engage the bevel 40 on the arm 38, thereby pushing both shoes away from the inner periphery of the clutch drum or housing, as shown in Fig. 8 of the drawings, because this will cause a slight oscillation of the plate 34, which latter is connected to the two shoes at 36, in the manner explained, and such oscillation will pull the shoes away from the interior of the drum. The mechanism is timed, in any suitable or desired manner, to cause the rotation to cease with the curved outer face of the block 37 engaging the curved face 41 of the arm 38, as shown in Fig. 8 of the drawings, thereby holding the shoes in released or disengaged position, as long as may be desired.

Therefore, in either form of the invention, a powerful and reliable clutch action is provided, in a clutch mechanism that can be opened or closed, or unloaded or loaded, abruptly, for any predetermined rotations of the shaft, with less danger of breakage or inaccuracy of operation than was true with certain clutches heretofore employed in the operation of various kinds of power-operated and clutch-controlled machinery.

In each form of the invention, it will be seen, there is a constantly rotating member, or member for constant rotation, together with pivoted friction shoes that rotate intermittently in unison with said constantly rotating member, when the clutch is opened and closed. Thus, while there is no transmission of power through the clutch, the said shoes are stationary and are not rotating, but as soon as the clutch is closed, the said shoes then rotate with the drumlike member, such as the member 1 in Fig. 1, or 24 in Fig. 5, the said shoes, in each form of the invention, being enclosed within said drumlike member. In this way, when the clutch is closed, the friction shoes, such as the shoes 7 of Figs. 2 and 3, or the shoes 28 of Figs. 6 and 8, are rotating, and the transmission of power is from the constantly driven drum member through the shoes to the shaft 3, or to the shaft 25, and as soon as the clutch is opened, both said shaft and the friction shoes are then free to stop rotating.

It will be seen that so far as the clutch mechanism itself is concerned, the shaft 3 or the shaft 25 is free to rotate, when the clutch is open, for there is nothing about the latter that tends to positively stop the rotation of said shaft, and it will be understood that the stoppage of the shaft in any machine operated thereby will be accomplished by a friction brake or any other suitable or known device for this purpose. In this way, there is no shock to the clutch, when the latter is opened, as the opening of the clutch imposes no strain thereon, in the stoppage of the shaft 3 or the shaft 25, as something else must perform the function of stopping the shaft in any machine operated thereby. In other words, if the shaft 3 or the shaft 25 should overrun, and should not stop as soon as the clutch is opened, the pin 16, for example, would ride on the side of the latch 12, a distance, without any shock or strain. But, of course, in the use of a clutch of this kind, for starting and stopping machinery, it is desirable to have the shaft stop each time in a predetermined position.

It will also be seen that the pivotal support 4 for the shoes 7 is rigid with the shaft 3, which latter may be called the output member of the mechanism, and in Figs. 5 to 8 the pivotal supports 30 for the shoes 28 are rigid with the shaft 25, which latter is the output member. The member 2 is the input member of the mechanism, shown in Figs. 1 to 4, as this receives the input of power, while the output of power is from the shaft 3, and this is true of each form of the invention, as in each form of the invention the pivotal support for the shoes is rigid with the output member. And, in each form of the invention, there is an oscillatory cam plate loosely engaging the shoes and relatively movable about the axis of said pivotal support.

With the arrangement shown and described, it will be seen that each pivoted friction shoe has individual spring pressure frictional engagement with the inner surface of the rotary drum, when the clutch is closed, the springs for this purpose being enclosed within the drum.

Thus the springs 9 are under compression, when the clutch is open, and as long as the cam member 12 is in the position shown in Fig. 3 of the drawings; and these springs are in their expanded condition as long as the member 12 is in the position shown in Fig. 2 of the drawings. Thus the rotation of the shaft 3 continues as long as the member 12 is in the position shown in Fig. 2 of the drawings, and the shaft does not rotate as long as the member 12 is in the position shown in Fig. 3 of the drawings. The springs 33 are also compression springs. it will be seen, and in each form of the invention there is an individual spring for each shoe, and each sprng is under compression when the clutch is open, and is in its expanded condition when the clutch is closed.

It will be seen that the output shaft 3, or the output shaft 25, and the friction shoes, in each form of the invention, are always in the same predetermined position each time the clutch is opened, which permits stoppage of the machine being operated, with the parts thereof in the same positions each time the clutch is opened.

It is obvious, of course, that the cam 12, or the cam 38, is employed to engage an element that revolves around the axis of the clutch, and to have a camming action therewith, as described.

What I claim as my invention is:

1. In a clutch, the combination of a shaft, a drum mounted to rotate freely on said shaft, while the latter is stationary, a support keyed to the shaft and closing one side of the interior of the drum, friction shoes each pivoted at one end upon the inner face of said support, compression coil springs each disposed between the distal end of one shoe and the adjacent proximal end of another shoe, operative by expansion to press the friction surfaces of the shoes against the inner frictional periphery of the drum, for causing the shaft to rotate with said drum, a cam plate oscillatory on said shaft a distance, having loose pivotal connection with the distal ends of said shoes, and mechanism cooperating with said springs for causing oscillation of said cam plate, to cause said shoes to engage and disengage said drum.

2. A structure as specified in claim 1, said mechanism comprising an endwise movable pin, arranged parallel with said shaft, provided with camming or wedging engagement with said plate, and a device for engaging said pin to move the latter endwise.

3. A structure as specified in claim 1, said mechanism comprising an endwise movable pin, arranged parallel with said shaft provided with camming or wedging engagement with said plate, and a device for engaging said pin to move the latter endwise, said device comprising a pivoted clutch latch having a camming or wedging engagement with said pin, whereby when the latch is disengaged from said pin, said springs are then free to press the shoes against the interior of the drum.

4. A structure as specified in claim 1, said mechanism comprising a pivoted element movable in a plane at right angles to the axis of said shaft, together with means between said pivoted element and said cam plate to oscillate the latter when the said element is moved about its axis in said plane.

5. A structure as specified in claim 1, said plate being oscillatory about the axis of said shaft and forming a connection between said shoes, whereby movement of one shoe will oscillate the plate and cause movement of the other shoe and thereby open or close the clutch, a cam rigid with the distal end of one shoe, and controllable means for engaging said came to open the clutch.

6. A structure as specified in claim 1, said plate being oscillatory about the axis of said shaft and forming a connection between said shoes, whereby movement of one shoe will oscillate the plate and cause movement of the other shoe and thereby open or close the clutch, a cam rigid with the distal end of the one shoe, and controllable means for engaging said cam to open the clutch, said engaging means comprising a pivoted cam arm, and cam means for causing said arm to move into and out of the path of said first-mentioned cam.

7. A structure as specified in claim 1, said mechanism comprising a cam on the distal end of one shoe, and means for engaging said cam to open and close the clutch.

8. In a clutch, an input member for constant rotation about the axis of the clutch, shoes pivotally supported at their ends for frictional engagement with said member, devices including an oscillatory cam plate loosely engaging the distal ends of said shoes and movable about said axis for causing engagement and disengagement of said shoes with said member, to in effect alternately close and open the clutch, and means intermittently rotatable with said shoes in unison with said member, when the clutch is alternately opened and closed, controllable by said devices to rotate one or more times while the clutch is held closed, including an output member which is rigid with the pivotal support of said shoes, said devices comprising an engaging portion on the distal end portion of one shoe, and means for actuating said engaging portion, thereby to relatively oscillate the cam plate and cause the opening of the clutch.

9. In a clutch, an input member for constant rotation about the axis of the clutch, shoes pivotally supported at their ends and having individual spring pressure frictional engagement with the inner surface of said member, when the clutch is closed, devices including an oscillatory cam plate having loose pivotal connection with the distal ends of said shoes and movable about said axis for causing engagement and disengagement of said shoes with said member, to in effect alternately close and open the clutch, and means intermittently rotatable with said shoes in unison with said member, when the clutch is alternately opened and closed, controllable by said devices to rotate one or more times while the clutch is held closed, including an output member which is rigid with the pivotal support of said shoes, and springs between the ends of the shoes for providing said spring pressure for pressing the shoes against said surface.

10. In a clutch, an input member for constant rotation about the axis of the clutch, shoes pivotally supported at their ends and having individual spring pressure frictional engagement with the inner surface of said member, when the clutch is closed, devices including an oscillatory cam plate having loose pivotal connection with the distal ends of said shoes and movable about said axis for causing engagement and disengagement of said shoes with said member, to in effect alternately close and open the clutch, and means intermittently rotatable with said shoes in unison with said member, when the clutch is alternately opened and closed, controllable by said devices to rotate one or more times while the clutch is held closed, including an output member which is rigid with the pivotal support of said shoes, said devices comprising an engaging portion on the distal end portion of one shoe, and means for actuating said engaging portion, thereby to relatively oscillate the cam plate and cause the opening of the clutch.

11. In a clutch, an input member for constant rotation about the axis of the clutch, shoes pivotally supported at their ends and having individual spring pressure frictional engagement with the inner surface of said member, when the clutch is closed, there being an individual compression spring for each shoe, with each spring under compression when the clutch is open, devices including an oscillatory cam plate having loose pivotal connection with the distal ends of said shoes and movable about said axis for causing engagement and disengagement of said shoes with said member, to in effect alternately close and open the clutch, and means intermittently rotatable with said shoes in unison with said member, when the clutch is alternately opened and closed, controllable by said devices to rotate one or more times while the clutch is held closed, including an output member which is rigid with the pivotal support of said shoes.

12. A structure as specified in claim 11, said devices comprising an engaging portion on the distal end portion of one shoe, and means for actuating said engaging portion, thereby to relatively oscillate the cam plate and cause the opening of the clutch.

13. A structure as specified in claim 11, said devices comprising a pin which is movable back and forth endwise parallel with said axis, for operating engagement with said cam plate.

14. A structure as specified in claim 11, said devices also comprising a pin extending parallel with said axis, at one side thereof, and means relatively formed to have a camming engagement with said pin, thereby to relatively oscillate the cam plate and cause the opening of the clutch.

15. A structure as specified in claim 11, said devices including a member movable parallel with said axis and having wedging engagement with said cam plate, and including an element having movement in a plane at right angles to said axis for engaging said last mentioned member.

16. A structure as specified in claim 11, said devices including a member movable parallel with said axis and having wedging engagement with said cam plate.

17. A structure as specified in claim 11, in which said springs are between the adjacent ends of the shoes.

18. In a clutch, an input member for constant rotation about the axis of the clutch, shoes pivotally supported at their ends for individual compression spring pressure frictional engagement with said member, devices including an oscillatory cam plate loosely engaging the distal ends of said shoes and movable about said axis for causing engagement and disengagement of said shoes with said member, to in effect alternately close and open the clutch, and means intermittently rotatable with said shoes in unison with said member, when the clutch is alternately opened and closed, controllable by said devices to rotate one or more times while the clutch is held closed, including an output member which is rigid with the pivotal support of said shoes, said devices comprising compression springs between the ends of the shoes for pressing the latter against said surface, with each spring under compression when the clutch is open.

19. In a clutch, a rotary input drum, an output shaft extending through the clutch and on which said drum is free to rotate, and means for intermittently in effect keying the drum to the shaft, comprising a member keyed to the shaft, shoes pivoted on said member, a compression spring for each shoe, engaging both shoes, for pressing the shoes against the drum, each spring being under compression between adjacent ends of the shoes when the clutch is open, and controllable means oscillatory about the axis of rotation for disengaging the shoes from said drum to open the clutch.

20. A structure as specified in claim 19, each spring being disposed for compression and expansion directly between the distal end of one shoe and the proximal end of another shoe.

21. A structure as specified in claim 19, said controllable means comprising a cam plate having loose pivotal engagement with the distal end of each shoe, oscillatory about the axis of the clutch, for actuating said shoes away from the drum when the clutch is opened, and in turn actuated by the shoes when the clutch is closed.

22. A structure as specified in claim 19, said controllable means comprising a movable cam for engaging and disengaging the distal end of one shoe, thereby to operate both shoes.

23. In a clutch, a rotary input drum, an output shaft on which said drum is free to rotate, and means for intermittently in effect keying the drum to the shaft, comprising a member keyed to the shaft, shoes pivoted on said member, a compression spring for each shoe, for pressing the shoes against the drum, each spring being under compression when the clutch is open, and controllable means for disengaging the shoes from said drum to open the clutch, said controllable means comprising a cam plate having loose pivotal engagement with the distal end of each shoe, oscillatory about the axis of the clutch, for actuating said shoes away from the drum when the clutch is opened, and in turn actuated by the shoes when the clutch is closed.

24. In a clutch, a rotary input drum, an output shaft on which said drum is free to rotate, and means for intermittently in effect keying the drum to the shaft, comprising a member keyed to the shaft, shoes pivoted on said member, a compression spring for each shoe, for pressing the shoes against the drum, each spring being under compression when the clutch is open, and controllable means for disengaging the shoes from said drum to open the clutch, said controllable means comprising a movable cam for engaging and disengaging the distal end of one shoe.

25. In a friction clutch, a rotary input member, a rotary output member, friction means for intermittently driving said output member from said input member, operable in a fixed transverse plane, and controlling means for causing the opening and closing of the clutch, including means carried by said output member and relatively oscillatory about the axis of rotation in another fixed transverse plane, with said output member always in the same predetermined position each time the clutch is opened, said controlling means comprising a cam for engaging a part that revolves around the axis of the clutch, operable into and out of camming position in a third transverse plane.

26. In a friction clutch, a rotary input member, a rotary output member, an output shaft extending through both members and keyed to the output member, friction means pivoted on said output member for intermittently driving said output member from said input member, operable toward and away from said shaft in a fixed transverse plane to stop and start the rotation of said shaft, and controlling means for causing the opening and closing of the clutch, including means concentric to said shaft and relatively oscillatory about the axis of rotation in another fixed transverse plane, to control said friction means, with said output member always in the same predetermined position each time the clutch is opened, said controlling means comprising a cam operable into and out of camming position in a third transverse plane.

LESLIE M. HILE.